United States Patent [19]

Russ

[11] Patent Number: 4,509,602
[45] Date of Patent: Apr. 9, 1985

[54] AGRICULTURAL IMPLEMENT WITH HINGE CONNECTION FOR FOLDING CROSS SHAFT

[75] Inventor: David E. Russ, Roscoe, Ill.

[73] Assignee: Allis-Chalmers Corp., Milwaukee, Wis.

[21] Appl. No.: 498,141

[22] Filed: May 25, 1983

[51] Int. Cl.³ .............................................. A01B 73/00
[52] U.S. Cl. .................................... 172/311; 172/501; 172/776
[58] Field of Search ............... 172/311, 501, 456, 446, 172/662, 776; 56/228, 385; 403/57, 72, 73, 79, 116, 157; 464/120

[56] References Cited

U.S. PATENT DOCUMENTS

| | | | |
|---|---|---|---|
| 1,059,884 | 4/1913 | Link | 403/116 X |
| 1,334,154 | 3/1920 | Harrison | 464/120 |
| 2,392,932 | 1/1946 | Macbeth | 403/73 |
| 2,460,216 | 1/1949 | Dalton | 464/120 |
| 2,828,597 | 4/1958 | Moore | 172/662 |
| 3,068,728 | 12/1962 | Shepherd | 403/79 |
| 3,460,631 | 8/1969 | Friesen et al. | 172/311 |
| 3,470,965 | 10/1969 | Quickstad | 172/456 |
| 3,536,144 | 10/1970 | Hood et al. | 172/311 |
| 3,783,951 | 1/1974 | Gugin | 172/311 |
| 4,050,522 | 9/1977 | Ralston et al. | 172/311 |
| 4,243,339 | 1/1981 | Dickerson | 403/157 X |
| 4,318,444 | 3/1982 | Hake | 172/456 |

Primary Examiner—Richard T. Stouffer
Assistant Examiner—Chris Coppens
Attorney, Agent, or Firm—Charles L. Schwab

[57] ABSTRACT

A hinge connection for a wheel supporting, segmented cross shaft of a winged implement permits the wing to be folded to a transport position in any raised or lowered position of the implement. The hinge connection includes a pin carried by a laterally outer end of the main frame segment of the cross shaft which cooperates with a pair of slots in legs extending from the adjacent end of a wing frame segment of the cross shaft.

4 Claims, 11 Drawing Figures

AGRICULTURAL IMPLEMENT WITH HINGE CONNECTION FOR FOLDING CROSS SHAFT

BACKGROUND OF THE INVENTION

1. Technical Field

This invention relates to a foldup agricultural implement and more particularly to the hinge connection in the cross axle at the folding axis between a wheeled main frame and a wheeled wing frame.

2. Prior Art Statement

Heretofore others have provided special hinge connections for folding cross axles of wheeled implements which permit the implement wings to be folded 90°, more or less, to allow wide implements to be folded to a narrower width for transport purposes. One such construction is shown in U.S. Pat. No. 3,460,631 issued Aug. 12, 1969 to V. W. Friesen et al on a High Clearance Wheel Mounted Spring-Tooth Harrow. When the wing of the Friesen et al construction is folded upwardly to a transport position, the connection between the wing and main frame segments of the cross axle is broken and the wing segment of the cross axle and its wheel are free to swing.

The use of a universal joint in the cross shaft for the transport and/or depth adjusting wheels of a folding implement is shown in the following U.S. patents:

| Number    | Issued Date      | Inventor and Title                                                                          |
|-----------|------------------|---------------------------------------------------------------------------------------------|
| 3,470,965 | October 7, 1969  | L. R. O. Quickstad; Ground Working Implement With Wing Sections Hinged to Center Section    |
| 3,536,144 | October 27, 1970 | W. R. Hood et al; Articulated Wheeled Frame for Agricultural Implements                     |

SUMMARY OF THE INVENTION

The agricultural implement using this invention has a main frame adapted to be connected in towed relation to a draft vehicle for forward movement through a field, a wing frame pivotally connected to one lateral side of the main frame for swinging movement about a horizontal longitudinal pivot axis between a generally horizontal position in which it is generally coplanar with the main frame to a folded upright transport position and a transverse cross shaft having main frame and wing frame segments which are substantially coaxial when the implement wing is lowered to a working position. The hinge connection used in this invention for joining adjacent ends of the cross shaft segments includes pin means secured to the adjacent end of the main frame segment of the cross shaft with coaxial cylindrical portions at substantially right angles to the axis of the main frame segment. Wall means in the adjacent end of the wing frame segment define a pair of slots extending in the direction of the axis of the wing frame segment. The slots lie in a plane passing through the axis of the wing frame segment, and the slots present substantially parallel confronting bearing surfaces in cooperative bearing engagement with the cylindrical portions of the pin means.

BRIEF DESCRIPTION OF THE DRAWINGS

One embodiment of the invention is illustrated in the drawings, in which:

FIG. 4 is a rear view of the cross axle hinge connection in the lowered (working) condition of the implement;

FIG. 5 is a view taken along the line V—V in FIG. 4;

DETAILED DESCRIPTION OF THE DRAWINGS

Figure 1:
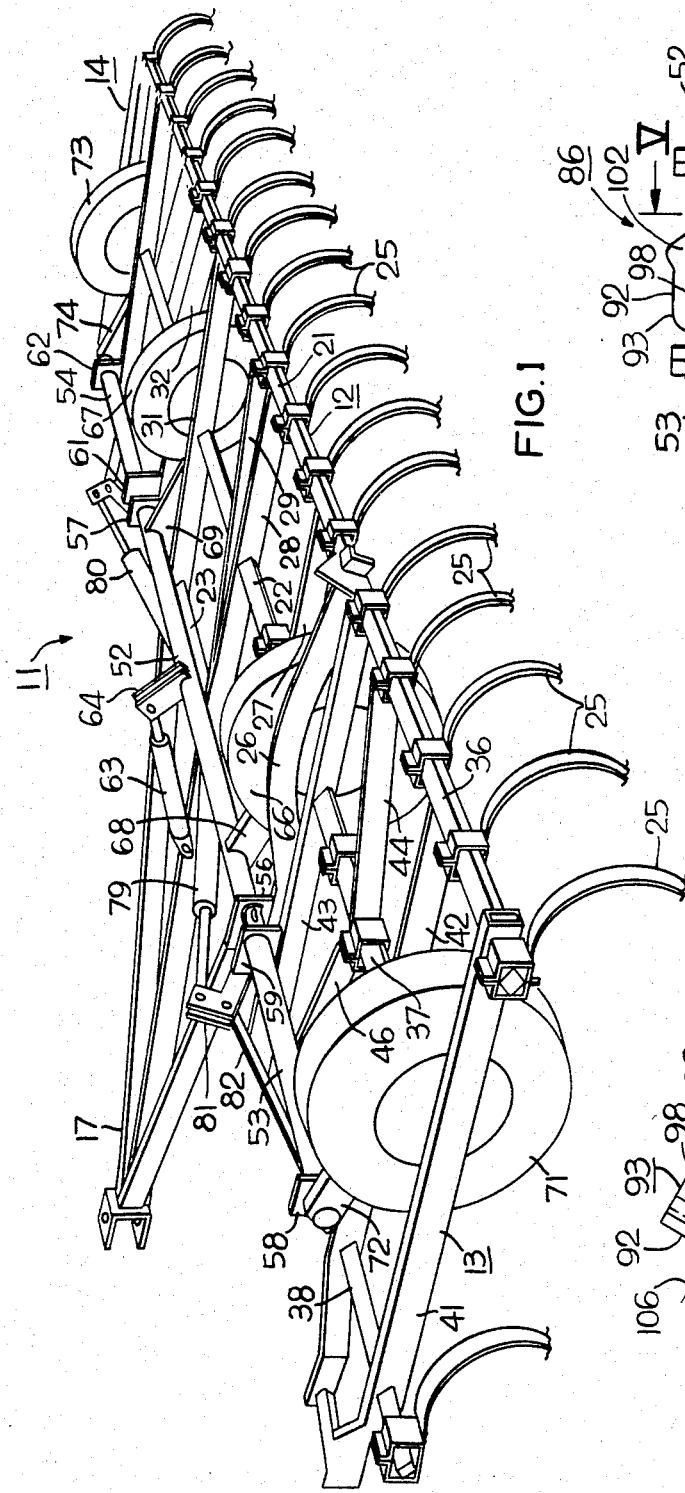
FIG. 1 is a perspective view of an implement incorporating the present invention.

The implement shown in FIG. 1 is a field cultivator 11 having a main frame 12 and a pair of wing frames 13, 14 pivotally connected to opposite lateral ends of the main frame for swinging movement between the illustrated field working position in which the frames 12, 13, 14 are generally coplanar to folded upright transport positions. A tongue 17 on the main frame 12 is adapted for draft connection to a tow vehicle such as a tractor. The main frame 12 includes transverse horizontal bars 21, 22, 23, to which spring shanks or tines 25 are secured by appropriate mounts, and longitudinally extending frame members 26, 27, 28, 29, 31, 32 rigidly secured as by welding to bars 21 and 23. Bar 22 is rigidly secured, as by welding, to longitudinal frame members 27, 28, 29, 31. Similarly, the left wing frame 13 includes transverse bars 36, 37, 38 supporting tines 25 with bars 36, 38 rigidly interconnected, as by welding, to longitudinal frame members 41, 42, 43. Transverse bar 37 is welded to frame members 42, 43 and to braces 44, 46 which are also welded to bars 36, 38, respectively. The right wing frame 14 is a reverse image of left wing frame 13.

Raising and lowering the implement is achieved by pivoting a transverse rock shaft 51 which includes a main frame segment 52 and left and right wing frame segments 53, 54. The main frame segment 52 of the rock shaft 51 is pivotally mounted on the main frame 12 by pivot blocks 56, 57, the left wing frame segment 53 of the rock shaft 51 is pivotally mounted on the left wing frame 13 by pivot blocks 58, 59 and the right wing frame segment 54 of the rock shaft 51 is pivotally mounted on the right wing frame 14 by pivot blocks 61, 62. The main frame segment 52 of the rock shaft 51 is selectively pivoted about its axis 85 by power means in the frame of a hydraulic jack 63 whose cylinder is pivotally connected to the main frame 12 and whose rod is pivotally connected to the free end of an arm 64 welded to and extending radially from the main frame rock shaft segment 52. The main frame 12 is supported by wheels 66, 67 rotatably mounted on the rear ends of arms 68, 69 welded to and extending rearwardly from the rock shaft segment 52; the left wing frame 13 is supported by a wheel 71 rotatably mounted on the rear end of an arm 72 secured by welding to rock shaft segment 53 and the right wing frame 14 is supported by a wheel 73 rotatably mounted on the rear end of an arm 74 welded to and extending rearwardly from the cross shaft segment 54. In the working condition of the implement 11, the shaft segments 52, 53, 54 are substantially coaxial, although the wing frames 53, 54 may swing up and down to compensate for uneven field conditions.

Figure 2:
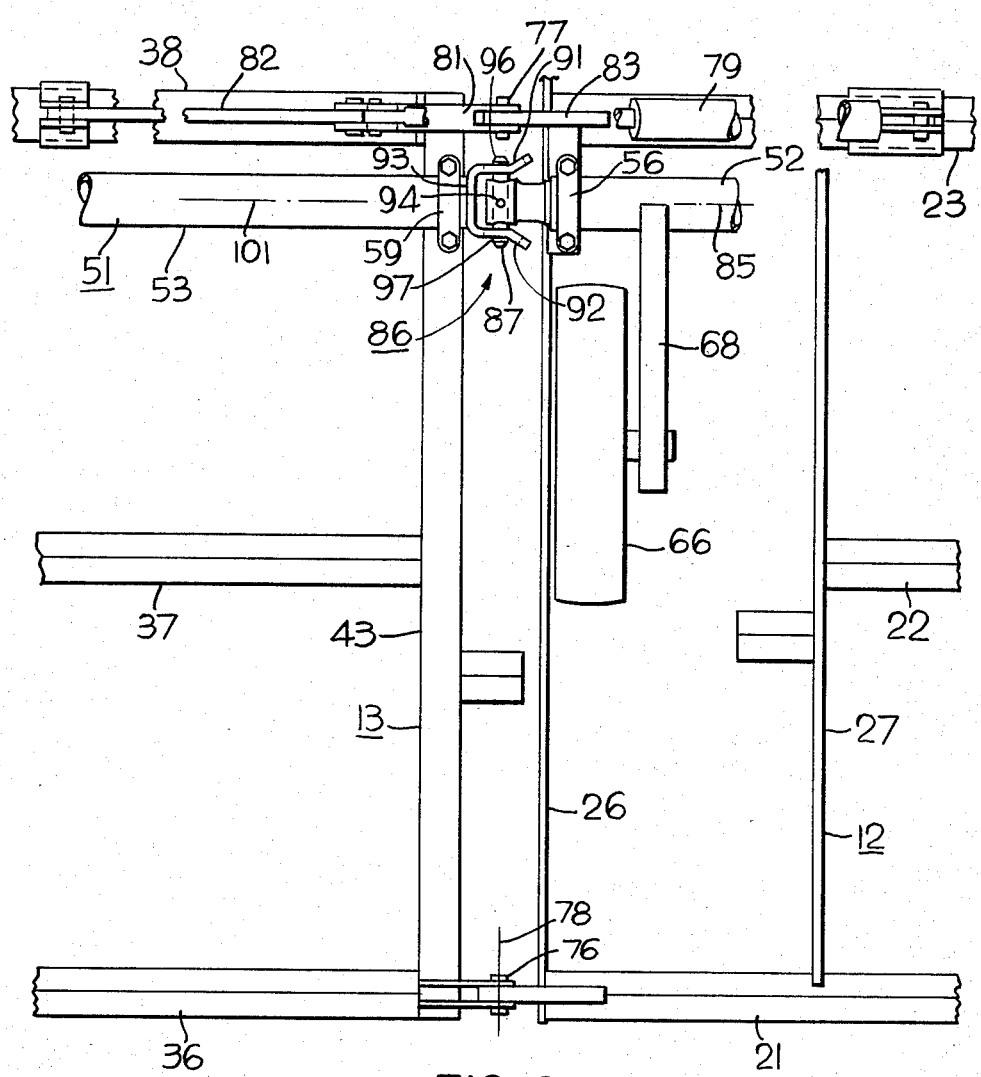
FIG. 2 is a partial top view of the implement shown in FIG. 1 adjusted to a partially raised condition with parts omitted for illustration purposes.
Figure 3:
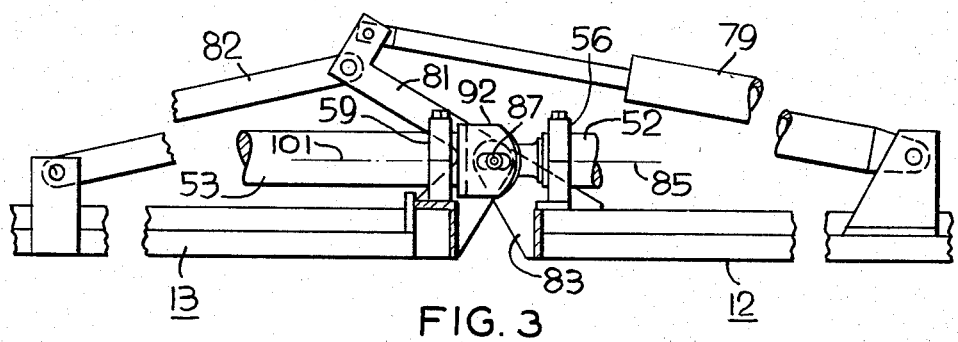
FIG. 3 is a rear view of the part of the implement shown in FIG. 2 with parts broken away for illustration purposes.

As shown in FIGS. 1, 2 and 3, the left wing frame 13 is pivotally connected to the main frame 12 by a pair of aligned pivot pins 76, 77 disposed on a horizontal longitudinal pivot axis 78 and the left wing is raised and lowered by power means in the form of a double acting hydraulic jack 79 having a cylinder pivotally connected to the main frame 12 and a rod pivotally connected to a bracket 81 secured to the wing frame 13. A reinforcing brace 82 is connected at its opposite ends to the wing frame 13 and the bracket 81. The bracket 81 is pivotally connected by the pin 77 to a bracket 83 welded to the main frame 12. The right wing frame 14 is similarly connected to the right side of the main frame 12 and is raised and lowered by a hydraulic jack 80.

Adjacent ends of the wing frame and main frame segments 53, 52 of the cross shaft 51 are connected by a hinge connection 86 which includes pin means in the form of a pin 87 having a central portion secured to the adjacent or laterally outer end of the main frame at right angles to the axis 85 of the main frame cross shaft segment 52 and a pair of slotted legs 91, 92 of a U-shaped part 93 welded to the adjacent or laterally inner end of the wing frame segment 53 of the cross shaft. The axis 85 of the main frame shaft segment 52 intersects the axis 106 of the pin 87. The pin 87, which is secured to the cross shaft segment 52 by a pin-like retainer 94, has cylindrical free end portions 96, 97 at opposite sides of the laterally outer end of the shaft segment 52 which extends into slots 98, 99, respectively, in the legs 91, 92. The slots 98, 99 extend horizontally (are elongated) in the direction of the axis 101 of cross shaft segment 53 and are defined by wall means presenting parallel confronting surfaces in bearing engagement with the cylindrical end portions 96, 97 of the pin 87. The inner parts of the legs are parallel to one another and the outer end parts 102, 101' of the legs 91, 92 diverge or flare radially outwardly from the axis 85 (in the axial direction away from the end of the segment 53) thereby avoiding interference with the end of shaft segment 52 when the wing is raised while the implement is either lowered or raised; in which condition the main shaft segment 52 is rotated in one direction or the other so as to place the pin 87 at an angle of about 30° to the horizontal plane of the implement main frame 12. The hinge connection between the main frame segment 52 and the wing frame segment 54 is similar to hinge connection 86.

OPERATION

Figure 8:
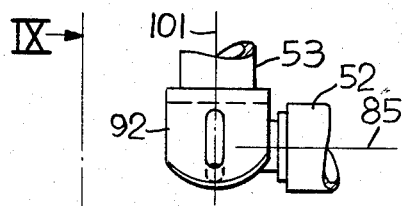
FIG. 8 is a rear view of the cross axle hinge connection with the implement in a lowered working condition and the left wing folded to a transport position.
Figure 9:
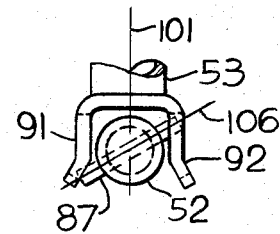
FIG. 9 is a view taken along the line IX—IX in FIG. 8.

When the implement 11 is in a lowered field working condition as shown in FIG. 1, wherein the hydraulic actuator has been contracted, the cross axle segments 52, 53, 54 are in alignment with the transport wheels 66, 67, 71, 73 serve to control the depth of penetration of the spring tines 25. In the lowered condition, the axis 106 of pin 87 of the cross axle hinge connection 86 will be disposed at about 30° to the horizon which is 30° to the plane of the horizontal main frame 12 as illustrated in FIGS. 4 and 5. If the left wing frame 13 is raised to a transport position with the implement lowered, the pin 87 would move in the slots 98, 99 to the position shown in FIGS. 8 and 9.

Figure 6:
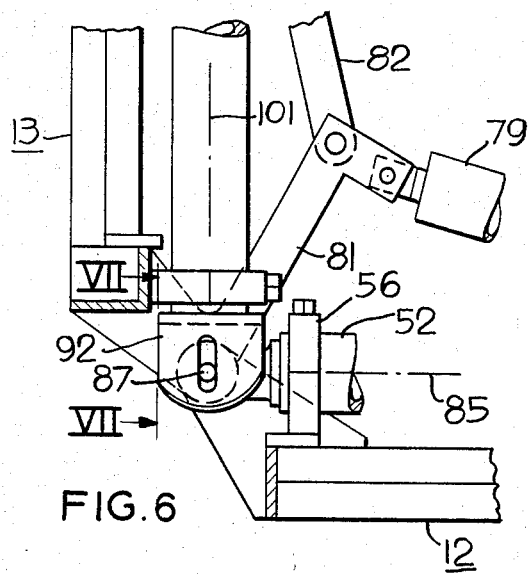
FIG. 6 is a partial rear view of the implement showing the left wing in a folded transport position with the implement in a partially raised condition.
Figure 7:
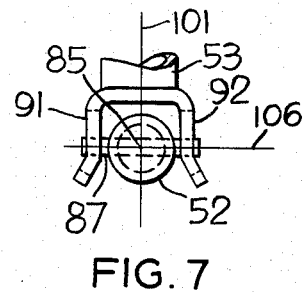
FIG. 7 is a view taken along the line VII—VII in FIG. 6.

FIG. 6 shows the left wing frame 13 of the implement raised 90° to a folded transport position which is achieved by contracting the hydraulic jack 79. As illustrated, the main frame rock shaft segment 52 has been rotated by partial expansion of jack 63 to place the implement in a partially raised position, in which condition the pin axis 106 is horizontal. FIG. 7 shows the position of the pin 87 in the slots 98, 99 of the legs 91, 92 with the implement main frame 12 partially raised.

Figure 10:
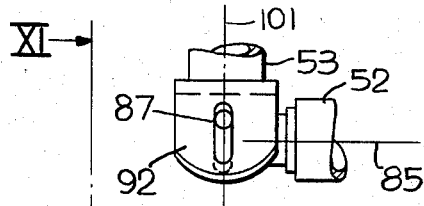
FIG. 10 is a rear view of the cross axle hinge connection with the implement in a raised transport condition and the left wing in a folded transport position.
Figure 11:
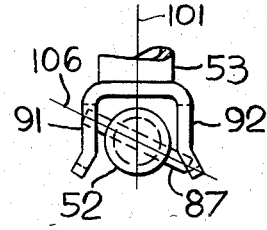
FIG. 11 is a view taken along the line XI—XI in FIG. 10.

FIG. 10 shows the main frame rock shaft segment 52 rotated approximately 25° from the condition shown in FIGS. 6 and 7 to a fully raised condition of the implement. In this condition, the axis 106 of the pin 87 will be 25° from the horizon or the horizontal plane of the main frame 12. If the left wing is folded to a transport position while the implement is raised or lowered, the wing frame shaft segment will always be rotated to the position illustrated in FIGS. 8 and 10 wherein the slots 98, 99 lie in a plane passing through the shaft segment axis 101 and parallel to the plane of the wing frame 13.

As is apparent from the foregoing description, a hinge connection has been provided for a segmented cross shaft of a winged implement which allows the wings to float during a field operation and permits the wings to be folded without damage to the hinge connection regardless of the raised or lowered condition of the implement. The hinge components, that is the pin 87 and legs 91, 92, are always in cooperative engagement, thereby avoiding problems of reregistration of separated hinge parts during lowering of an implement wing.

The embodiments of the invention in which an exclusive property or privilege is claimed are defined as follows:

1. In an agricultural implement having a main frame adapted to be connected in towed relation to a draft vehicle for forward movement through a field, a wing frame pivotally connected to one lateral side of the main frame for swinging movement about a horizontal longitudinal pivot axis between a generally horizontal working position in which it is generally coplanar with the main frame to a folded upright transport position and a transverse cross shaft with radially extending arms rotatably carrying support wheels and having main frame and wing frame segments which are substantially coaxial in the working position of said wing frame, a hinge connection joining adjacent ends of said cross shaft segments at said longitudinal pivot axis characterized by a pin having a central portion rigidly secured to said adjacent end of said main frame segment of said cross shaft with its axis at substantially right angles to said axis of said main frame segment and having opposite cylindrical end portions, a pair of legs having corresponding ends rigidly secured to the adjacent end of said wing frame segment of said cross shaft and extending therefrom toward said main frame segment and terminating in free ends, wall means in said legs defining a pair of slots elongated in the direction toward said main frame segment, said slots lying on opposite sides of and being radially open relative to said axis of said wing frame segment, each of said slots presenting parallel confronting bearing surfaces, said pin end portions being disposed, respectively, in said slots and being in cooperative bearing engagement with said bearing surfaces thereof when said wing frame is in its working and transport positions and during movement of said wing frame between said positions.

2. The implement of claim 1 wherein said legs have parts adjacent said wing frame segment which are parallel to said axis of the latter and parts adjacent said free ends which diverge from one another in the direction away from said adjacent end of said wing frame segment.

3. In an agricultural implement having a main frame adapted to be connected in towed relation to a draft vehicle for forward movement through a field, a wing frame pivotally connected to one lateral side of the main frame for swinging movement about a horizontal longitudinal pivot axis between a generally horizontal working position in which it is generally coplanar with the main frame to a folded upright transport position and a transverse cross shaft pivotally mounted on said frames with radially extending arms rotatably carrying support wheels, said shaft having main frame and wing frame segments which are substantially coaxial in the working position of said wing frame, a hinge connection joining adjacent ends of said cross shaft segments at said longitudinal pivot axis characterized by pin means fixedly secured to said adjacent end of said main frame segment of said cross shaft including coaxial cylindrical portions at opposite sides of said axis of said main frame segment, the axis of said cylindrical portions being at substantially right angles to said axis of said main frame segment and wall means in the adjacent end of said wing frame segment of said cross shaft defining a pair of slots elongated in the general direction toward said main frame segment, said slots lying on opposite sides of and being radially open relative to said axis of said wing frame segment, said cylindrical portions being disposed respectively in said slots and said slots presenting substantially parallel bearing surfaces in cooperative bearing engagement with said cylindrical portions when said wing frame is in its working and transport positions and during movement of said wing frame between said positions.

4. The combination of claim 3 wherein said frame may be raised and lowered by pivoting said main frame segment of said cross shaft when said wing frame is in said folded upright transport position without causing said wing frame segment of said cross shaft to pivot about its axis.

* * * * *